UNITED STATES PATENT OFFICE.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

ROAD AND STREET CONSTRUCTION.

941,548.     Specification of Letters Patent.     Patented Nov. 30, 1909.

No Drawing.     Application filed January 30, 1909. Serial No. 475,221.

*To all whom it may concern:*

Be it known that I, JOSEPH HAY AMIES, a citizen of the United States, residing at Philadelphia, in the county of Philadelphia and State of Pennsylvania, have invented certain new and useful Improvements in Road and Street Construction, of which the following is a specification.

Objects of the present invention are to provide a bituminous road and street construction having lasting qualities, and possessed of uniform elasticity in all solar temperatures, and the surface of which is calculated to be free of raveling.

Other objects of the invention are to provide a road or street the surface of which is dustless and which will effectively prevent the skidding of horseless vehicles.

A still further object of the invention is to provide such a road construction at a very low cost both as to installation and maintenance.

To attain the above described desirable results I place in a mixing machine or upon a mixing board a batch or quantity of clean sharp sand, crushed stone, grit, gravel, fine pebbles, slag, or the like. I then mix the said batch with a due quantity of powdered calcium oxid or calcium hydrate, preferably calcium oxid, commonly known as quick or unslaked lime.

Calcium oxid in its use takes up the inherent moisture of the mineral material and when quite fresh will begin at once to heat in the process of slaking. In this condition I add about 20 per cent. by weight of boiling asphalt. The reason for using this large percentage of asphalt will appear hereinafter.

It may be here remarked that a hard asphalt in a powdered condition, may be used in which case I may use the flux in either a cold or a hot state. The powdered asphalt is usually mixed with the said batch before the flux is added. After the said materials have been well mixed I throw thereon a small amount of water dampened sharp sand, grit, gravel, or very fine pebbles, having previously mixed the same with a small quantity of powdered calcium oxid. After the latter has been added I permit the mixing machine to make a few rotations, and then the batch is ready to be loaded upon cars for shipment or to be placed in elevated bins to be held for shipment, or it may be immediately used.

The result obtained by the foregoing process will now be explained. When hot or cold asphaltic or bituminous cement is mixed with hot or cold sand, grit or pebbles, a heavy, hard, bunched mass impossible to handle results. What I obtain is a friable and granular composition that will mass and adhere when rolled or otherwise compressed after being placed in position. In the above described process I secure these necessary results because the calcium oxid permits me to use a large percentage of the fluxing element owing to the fact that it takes up, and converts, and fixes the volatile oils and fats thereof. The large percentage of flux modifies and produces a character of cement impossible to secure in any other way and causes a permanent, ever active, adhesive quality of the friable and granular particles. This adhesive quality will remain active in any ordinary temperature, and the effect of the pulverized calcium oxid is to make the manufactured composition indifferent to changes in solar temperatures, and to practically eliminate aging by taking up and fixing the volatile elements. The friable and granular condition above described is produced by the calcium oxid. When it slakes it expands with powerful internal pressure forcing the particles of the mass apart, coating them with a body of lime dust which causes a suspension of the adhesive tendency of the said particles. The dampened sand, grit, and the like and the deferred calcium oxid cause a surface slaking with the result that more surface coating of the particles of the mass with a dust of lime ensues thereby improving the granular and friable condition of the said composition. The said composition is preferable but I may use other compositions of a similar character.

I will now describe the process of applying the above described composition to a road bed. I first provide a suitable foundation of heavy stone upon a well rolled and compressed subgrade. Where needed this subgrade must be perfectly drained and all soft places taken out and well filled with hard tamped stones. Upon this heavy stone foundation I pour a suitable liquid asphalt and thereon apply a layer of the above described composition. Upon this layer of composition I place a course of broken stones, all small enough to pass through an inch or an inch and one-half ring. I then roll this course of stones into the said composition. I again put thereon a layer of the said composition and roll the same well into the course of stone previously laid. I then place thereon a course of stones all fine enough to pass through a 3/4" ring, and roll this course of stones until well compacted. I then add and evenly distribute over this last mentioned course a layer of the said composition and roll it well upon and into the said course of stones. This process I continue again and again until I have a surfacing sufficiently thick when compressed to meet the specifications provided, for the building of the road. The last course of the said composition constitutes the facing of the road or street and is laid much thicker than the previous layers. This facing I roll well with a dampened roller until suitably compacted and then I apply a very heavy roller, having previously swept over the face of the road Portland cement, stone dust, or stone dust and Portland cement. The said composition has been made very "fat" with asphaltum or bituminous cement, containing as described in weight, about 20% of the asphaltic cement, and when the rolling proceeds, this is sufficient to cause the uncoated courses of stone to adhere in a firm bond. The surface of the paving is composed of said "fat" composition and is thick enough to wear well down into the last course of stone and firmly bind it together.

The result will be an elastic surfacing from which aging has been practically eliminated and which is practically indifferent to changes of the weather. A dustless, water and air proof road is provided, free of raveling upon which horses are not apt to slip and horseless vehicles to skid.

What I claim is:

The herein described process of road construction which consists in providing a suitable foundation, applying thereto a liquid asphalt, placing thereupon a layer of substantially the herein described composition, spreading thereupon a course of broken stone and compressing same with respect to said composition, placing thereupon a second layer of said composition and compressing same with respect to the aforesaid course of stone, then spreading thereover a second course of broken stone and compressing same, then again and again repeating the operation of laying layers of composition and stone and compressing same and finally bringing the last layer of said composition to a face, substantially as and for the purpose set forth.

In testimony whereof I have hereunto signed my name.

JOSEPH HAY AMIES.

Witnesses:
WILLIAM J. JACKSON,
S. F. KOCH.